United States Patent
Alpert et al.

(10) Patent No.: US 9,846,237 B2
(45) Date of Patent: Dec. 19, 2017

(54) APPARATUS, SYSTEM AND METHOD OF TIME PRESERVATION

(71) Applicant: Intel Corporation, Santa Clara, CA (US)

(72) Inventors: Yaron Alpert, Hod Hasharon (IL); Gil Zukerman, Hod HaSharon (IL)

(73) Assignee: INTEL CORPORATION, Santa Clara, CA (US)

( * ) Notice: Subject to any disclaimer, the term of this patent is extended or adjusted under 35 U.S.C. 154(b) by 714 days.

(21) Appl. No.: 13/924,578

(22) Filed: Jun. 23, 2013

(65) Prior Publication Data
US 2014/0375496 A1 Dec. 25, 2014

(51) Int. Cl.
*G01S 1/02* (2010.01)
*G01S 19/01* (2010.01)
*G01S 19/05* (2010.01)
*G01S 19/24* (2010.01)
*G01S 5/02* (2010.01)

(52) U.S. Cl.
CPC ............ *G01S 19/01* (2013.01); *G01S 5/0205* (2013.01); *G01S 5/0236* (2013.01); *G01S 19/05* (2013.01); *G01S 19/24* (2013.01)

(58) Field of Classification Search
CPC .......... G01S 19/01; G04R 20/00; G04R 20/02
USPC .................................................... 342/357.39
See application file for complete search history.

(56) References Cited

U.S. PATENT DOCUMENTS

2003/0107513 A1*  6/2003  Abraham ............. G01S 5/0018
                                                                342/357.25
2009/0146871 A1*  6/2009  Abraham ............. G01S 19/256
                                                                342/357.73
2011/0244891 A1* 10/2011  Ghinamo ............... G01S 19/20
                                                                455/456.6
2013/0162468 A1*  6/2013  Kim ........................ G01S 19/42
                                                                342/357.25

OTHER PUBLICATIONS

OMA Secure User Plane Location Architecture, Candidate Version 2.0—May 27, 2011; Open Mobile Alliance OMA-AD-SUPL-V2_0-20110527-C; 54 pages.
Andrei Popescu, Google, Inc. Geolocation API Specfication, W3C Candidate Recommendation Sep. 7, 2010. W3C Geolocation Working Group; 14 pages.
OMA Mobile Location Protocol 3.3, Candidate Version 3.3—Aug. 31, 2010; Open Mobile Alliance OMA-TS-MLP-V3_3-20100831-C; 138 pages.
IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.

\* cited by examiner

*Primary Examiner* — Tashiana Adams
*Assistant Examiner* — Helena Seraydaryan
(74) *Attorney, Agent, or Firm* — Shichrur & Co.

(57) ABSTRACT

Some demonstrative embodiments include apparatuses, systems and/or methods of time preservation. For example, an apparatus may include a time controller to preserve a time of a clock of a mobile device based on signals received by the mobile device from less than four location origin transmitters, the time controller is to determine the time based on a position of a location origin transmitter of the less than four location origin transmitters and one or more parameters relating to a transmission path between the location origin transmitter and the mobile device.

30 Claims, 4 Drawing Sheets

APPARATUS, SYSTEM AND METHOD OF TIME PRESERVATION

TECHNICAL FIELD

Embodiments described herein generally relate to time preservation.

BACKGROUND

A mobile device may include several collocated wireless communication units. For example, the mobile device may include a cellular communication unit, a Wireless Fidelity (WiFi) communication unit, a Global Navigation Satellite System (GNSS) communication unit, and the like.

Some of the wireless communication units may require an accurate clock to perform one or more functionalities. For example, the GNSS communication unit may require an accurate clock for acquiring one or more GNSS satellites, in order to enable an estimation of a location of the mobile device.

The process of preserving an accurate clock may be time and/or power consuming.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
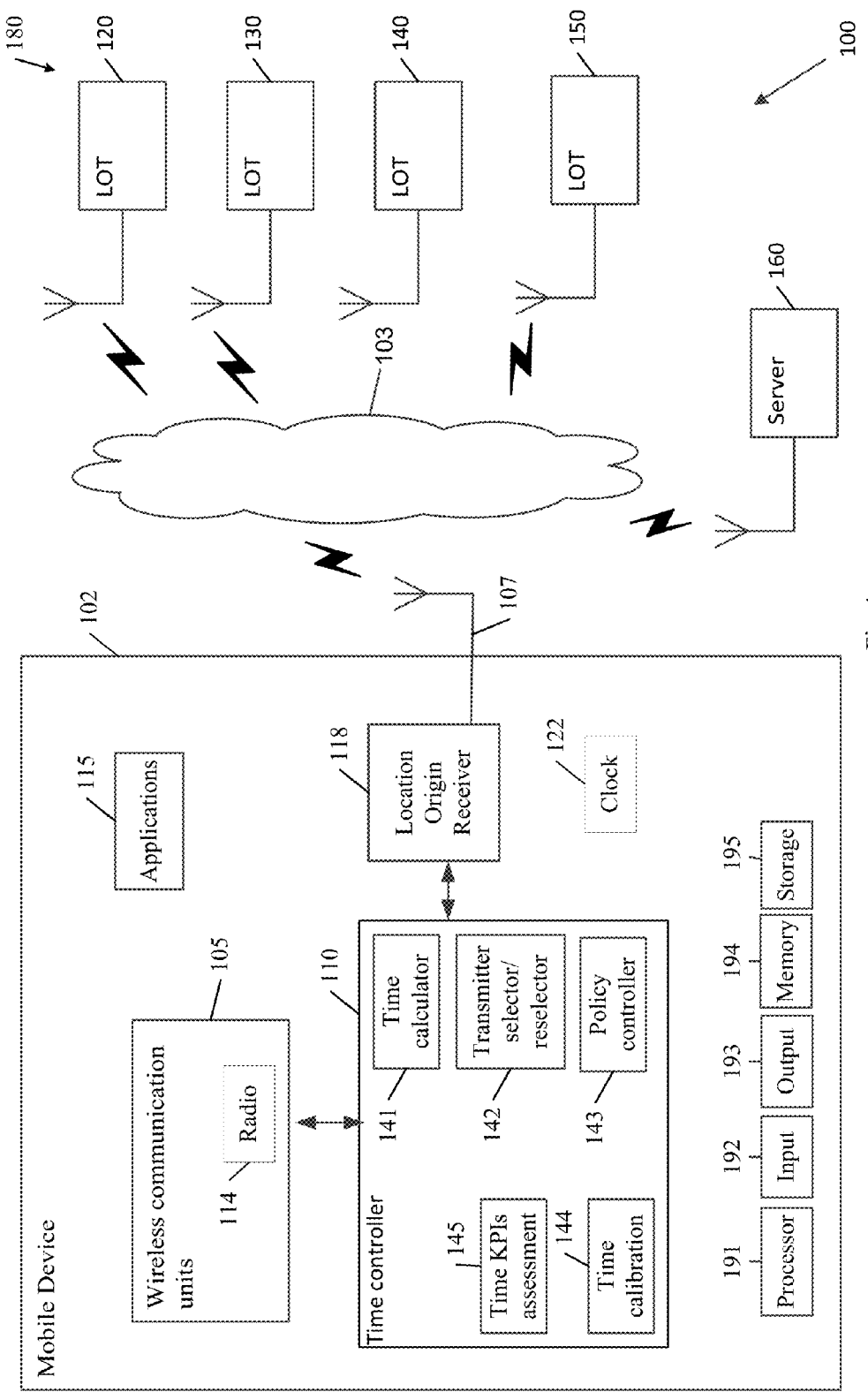
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (IEEE Std. 802.11 ad-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2102; IEEE802.11 task group ac (TGac) ("IEEE802.11-09/0308r12—TGac Channel Model Addendum Document"); IEEE 802.11 task group ad (TGad) (IEEE P802.11ad Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012); IEEE 802.11-REVmc (IEEE P802.11-REVmc/D1.2—Telecommunications and information exchange between systems, Local and metropolitan area networks—Specific requirements, Part 11: Wireless LAN Medium Access Control (MAC) and Physical Layer (PHY) Specifications, April 2013)) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.3, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Open Mobile Alliance (OMA) standards, including the Secure User Plane Location (SUPL) protocol (SUPL-OMA-AD-SUPL-V2.0 5.3.1.8), the Mobile Location Protocol (MLP) (OMA-TS-MLP v 3.3, March 2009) and/or future versions and/or derivatives thereof, devices and/or networks operating in accordance with existing In Location Alliance protocols and/or standards and/or future versions and/or derivatives thereof, devices and/or networks operating in accordance with existing World-Wide-Web Consortium (W3C) standards, including the W3C Hypertext Markup Language (HTML) Version 5, October 2010 and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "access point" (AP), as used herein, may include an entity that contains one station (STA) and provides access to distribution services, via the WM for associated STAs.

The phrases "power save" and "power save mode", as used herein, may refer, for example, to reducing, diminishing, shutting down, powering off, turning off and/or switching off the electrical current to a device and/or component, and/or to switching the device and/or component to operate at a sleep mode, a reduced-power mode, a stand-by mode, an idle mode and/or any other operation mode, which consumes less power than required for full and/or normal operation of the device and/or component, e.g., for full reception, handling, decoding, transmitting and/or processing of wireless communication signals.

Reference is now made to FIG. 1, which schematically illustrates a block diagram of a system 100, in accordance with some demonstrative embodiments.

In some demonstrative embodiments, system 100 may include a wireless communication device 102 capable of communicating content, data, information and/or signals over wireless communication medium 103. For example, device 102 may include one or more wireless communication units 105 capable of communicating over wireless medium 103 via one or more antennas 107.

In some demonstrative embodiments, device 102 may include a mobile device, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile phone, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a video device, an audio device, an A/V device, a gaming device, a media player, a Smartphone, or the like.

In some demonstrative embodiments, mobile device 102 may also include, for example, a processor 191, an input unit 192, an output unit 193, a memory unit 194, and a storage unit 195. Mobile device 102 may optionally include other suitable hardware components and/or software components. In some demonstrative embodiments, some or all of the components of mobile device 102 may be enclosed in a common housing or packaging, and may be interconnected or operably associated using one or more wired or wireless links. In other embodiments, components of mobile device 102 may be distributed among multiple or separate devices.

Processor 191 include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of mobile device 102 and/or of one or more suitable applications.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by mobile device 102.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, wireless medium 103 may include for example, a Radio Frequency (RF) channel, a WiFi channel, a Bluetooth channel, a cellular channel, a Global Navigation Satellite System (GNSS) Channel, a Near Field Communication (NFC) channel, a Hybrid Digital Radio (HDR) channel, a Frequency Modulation (FM) channel, and the like.

In some demonstrative embodiments, antennas 107 may include any type of antennas suitable for transmitting and/or receiving wireless communication signals, blocks, frames, transmission streams, packets, messages and/or data. Types of antennas that may be used for antennas 107 may include but are not limited to internal antenna, dipole antenna, omni-directional antenna, a monopole antenna, an end fed antenna, a circularly polarized antenna, a micro-strip antenna, a diversity antenna, a phase array antenna and the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, wireless communication units 105 may include one or more radios 114, e.g., including one or more wireless transmitters, receivers and/or transceivers able to send and/or receive wireless communication signals, RF signals, frames, blocks, transmission streams, packets, messages, data items, and/or data. In one example, the radios may include modulation elements, demodulation elements, amplifiers, analog to digital and digital to analog converters, filters, and/or the like. For example, wireless communication units 105 may include or may be implemented as part of a wireless Network Interface Card (NIC), and the like.

In some demonstrative embodiments, wireless communication units 105 may include a plurality of co-located wireless communication units configured to receive wireless communication signals via one or more antennas 107. For example, wireless communication units 105 may include a first wireless communication unit, a second wireless communication unit and/or a third wireless communication unit. One or more of wireless communication units 105 may utilize a shared common antenna 107 and/or one or more of the plurality of wireless communication units may utilize separate dedicated antennas 107.

In some demonstrative embodiments, wireless communication units 105 may include one or more global navigation satellite system (GNSS) wireless communication units, one or more wireless-fidelity (WiFi) wireless communication units, one or more Bluetooth (BT) wireless communication units, one or more cellular wireless communication units, e.g., a second generation cellular (2G) communication unit, a third generation cellular (3G) communication unit, a Universal Mobile Telecommunication System (UMTS) communication unit, a Long Term Evolution (LTE) communication unit, one or more near field communication (NFC) wireless communication units and/or one or more digital radio (DR) wireless communication units, and the like.

For example, the first and second wireless communication units may include GNSS wireless communication units, and/or the third wireless communication unit may include a DR wireless communication unit. In other embodiments, the first, second and/or third wireless communication units may include any other wireless communication unit.

In some demonstrative embodiments, one or more elements of device 102 may require an accurate time to perform one or more functionalities.

In some demonstrative embodiments, device 102 may include one or more applications 115 to provide one or more services and/or information to a user of device 102.

In some demonstrative embodiments, device 102 may be requested by applications 115 an accurate time to perform one or more functionalities. For example, applications 115 may include a navigation application, which requires an accurate time to enable accurate navigation.

In one example, a GNSS wireless communication unit may require the accurate time to enable a relatively quick acquiring of one or more satellites of the GNSS system, which may enable device 102 to estimate the location of device 102.

In another example, a cellular wireless communication unit may require an accurate time, e.g., to search and/or communicate with cellular base stations.

In some demonstrative embodiments, device 102 may include at least one clock source 122 configured to generate at least one clock signal to be provided to the one or more elements of device 102, which require an accurate time, e.g., wireless communication units 105, applications 115 and/or other elements of device 102.

In some demonstrative embodiments, the clock signal may be provided to the elements via hardware, e.g., a signal or a line, and/or software, e.g., an interface, an application programming interface (API) and the like.

In some demonstrative embodiments, clock 122 may be implemented as part of a wireless communication unit of wireless communication units 105, as part of the NIC, and/or as any other element of device 102, e.g., a system clock of device 102.

In some demonstrative embodiments, the signal generated by clock 122 may have a relatively reduced accuracy, for example, due to production cost considerations of device 102.

In some demonstrative embodiments, device 102 may maintain continuous connectivity to wireless medium 103, e.g., at an efficient power consumption.

In some demonstrative embodiments, device 102 may be configured to preserve the time of clock 122 and to provide time assistance to one or more elements of device 102, for example, to maintain the continuous connectivity to wireless communication medium 103, e.g., at the efficient power consumption.

In some demonstrative embodiments, utilizing the accurate time, e.g., by applications 115, wireless communication units 105, and/or the one or more elements of device 102, may increase a performance of device 102, and/or may reduce power consumption of device 102.

In some demonstrative embodiments, device 102 may be configured to provide the time assistance, which may enable device 102 to provide a relatively accurate time to the one or more elements of device 102. For example, device 102 may provide the accurate time to an application of application 115.

In some demonstrative embodiments, device 102 may be configured preserve the time of clock 122 to enable device 102 to work utilizing a low rate and/or a relatively accurate clock.

In some demonstrative embodiments, device 102 may preserve the time of clock 122 to enable device 102 to rapidly re-acquire a GNSS satellite, a BS and/or an AP, for example, after device 102 wakes up, e.g., from a non-operational mode, e.g., a sleep mode and/or an idle mode, of device 102.

In some demonstrative embodiments, preserving the time of clock 122 may be performed, for example, when an accuracy of the time of clock 122 decreases.

In some demonstrative embodiments, time preservation of clock 122 may be achieved by synchronizing clock 122 to one or more clock origins, e.g., having a relatively accurate time.

In some demonstrative embodiments, the accuracy of the time of clock 122 may decrease, for example, if clock 122 is not synchronized with the one or more clock origins for a relatively long period of time.

In some demonstrative embodiments, clock 122 may not be synchronized to the one or more clock origins for a relatively long period of time, for example, when device 102 is at a power save mode, e.g., the sleep mode and/or the idle mode.

In some demonstrative embodiments, device 102 may preserve the time of clock 122, for example, by synchronizing clock 122 to the one or more clock origins, e.g., upon waking up from the power save mode.

In some demonstrative embodiments, the time of the clock origins may be provided to device 102 by one or more location origin transmitters (LOTs).

In some demonstrative embodiments, system 100 may include one or more LOTs 180. For example, LOTs 180 may include a first LOT 120, a second LOT 130, a third LOT 140, and/or a fourth LOT 150.

In some demonstrative embodiments, LOTs 180 may include one or more GNSS satellites, one or more cellular source transmitters, e.g., cellular base stations, cellular operators, cellular antennas and the like, one or more digital radio stations, one or more BT devices, one or more WiFi hotspots or AP's, one or more NFC devices, and the like. For example, LOT 120, LOT 130, LOT 140 and/or LOT 150 may include GNSS satellites.

In some demonstrative embodiments, LOTs 180 may include one or more clock origins configured to provide a relatively accurate time.

In some demonstrative embodiments, LOTs 180 may transmit signals ("LOT signals"), which include time information of the clock origins of LOTs 180. For example, an LOT signal transmitted from a GNSS satellite may include time information relating to the time of a clock origin of the GNSS satellite.

In some demonstrative embodiments, device 102 may include one or more location origin receivers 118 to receive the LOT signals via antennas 107.

In some demonstrative embodiments, location origin receivers 118 may receive the LOT signals and may provide the LOT signals to wireless communication units 105, clock 122, and/or the one or more elements of device 102, which require the accurate time.

In some demonstrative embodiments, location origin receivers 118 may be implemented as part of wireless communication units 105. In other embodiments, location origin receivers 118 may be implemented as any other element of device 102.

In some demonstrative embodiments, device 102 may preserve the time of clock 122 based on the time information received from the LOT signals.

For example, clock 122 may be synchronized to a clock origin of a GNSS satellite, e.g., while tracking the GNSS satellite; a clock origin of a cellular base station, e.g., while communicating with the base station; and/or a clock origin of a radio station, e.g., while communicating with the radio station.

In some demonstrative embodiments, the time of clock 122 may be determined based on LOT signals including time information from at least four LOTs of LOTs 180. For example, the time of clock 122 may be determined based on LOT signals from LOT 120, LOT 130, LOT 140 and LOT 150.

For example, a system of four equations having four variables, e.g., time, and a location of device 102 in three dimensions, may be determined based on LOT signals from the four LOTs. Accordingly, solving the system of the four equations may result in an accurate time and an estimated location of device 102.

In some demonstrative embodiments, determining the time of clock 122 based on LOT signals from the at least four LOTs may increase power consumption and may reduce performance of device 102.

Some demonstrative embodiments may enable preserving the time of clock 122 based on LOT signals received from less than four LOTs, for example, based on LOT signals received from LOTs 120, 130, and 140.

Some demonstrative embodiments may enable preserving time of clock 122 based on LOT signals received from less than three LOTs, for example, based on LOT signals received from LOTs 120 and 130.

Some demonstrative embodiments may enable preserving time of clock 122 based on LOT signals received from a single LOT, for example, based on LOT signals received only from LOT 120.

In some demonstrative embodiments, device 102 may include a time controller 110 to preserve the time of clock 122 based on signals received by device 102 from less than four LOTs, e.g., as described below.

In some demonstrative embodiments, time controller 110 may determine the time of clock 122 based on a position of an LOT of the less than four LOTs and one or more parameters relating to a transmission path between the LOT and device 102. For example, time controller 110 may determine the time of clock 122 based on a position of LOT 130 and one or more parameters relating to the transmission path between LOT 130 and device 102 e.g., as described below.

In some demonstrative embodiments, time controller 110 may include and/or may perform the functionality of one or more modules configured to preserve the time of clock 122. For example, time controller 110 may include a time calculator 141, a time key performance indicators (KPIs) assessment module 145, a transmitter selector/reselector 142, a time calibration module 144, and/or a policy controller 143, e.g., as described in detail below.

In some demonstrative embodiments, an LOT signal received from the LOT may indicate the position of the LOT. For example, an LOT signal received from LOT 120 may indicate a position of LOT 120.

In some demonstrative embodiments, the position may include an orbit position or a position fix.

In one example, the LOT signal received from LOT 120 may include a position fix of LOT 120, for example, if LOT 120 includes a cellular base station.

In another example, the LOT signal received from LOT 120 may include an orbit position of LOT 120, for example, if LOT 120 includes a GNSS satellite.

In some demonstrative embodiments, system 100 may include a server 160 configured to provide the position of the LOT to device 102. For example, device 102 may request from server 120 the location of LOT 120 and server 120 may provide the location of LOT 120 to device 120.

In some demonstrative embodiments, time controller 110 may select the LOT based on one or more criterions ("LOT criterions"). The LOT criterions may include, for example, a quality criterion relating to a quality of a signal received from the LOT, an availability criterion relating to an availability of the LOT, an accuracy criterion relating to an accuracy of a clock of the LOT, and/or a key performance indicator (KPI) criterion.

The term "KPI", as used herein with respect to an entity, may include any performance indicators corresponding to the entity and configured to evaluate an entity attribute, an entity activity, an entity behavior and/or the like, which are related to a performance of the entity.

In some demonstrative embodiments, the KPIs of an LOT may include one or more particular attributes of the LOT, e.g., an accuracy of location information provided by the LOT, a power consumption for communicating with the LOT, a type of the LOT, an availability of the LOT, and the like; and/or one or more attributes of a connectivity type to the LOT, e.g., half or full duplex, a connectivity wireless medium signal quality, a security level, a communication frequency band, and the like.

In some demonstrative embodiments, transmitter selector 142 may be configured to select the LOT based on the LOT criterions.

In some demonstrative embodiments, transmitter selector 142 may select the LOT based on the time information of an LOT signal received from the LOT and/or based on one or more signal characteristics of the LOT signal received from the LOT.

For example, transmitter selector 142 may select LOT 120 and may not select LOT 130, for example, if a quality of a signal received from LOT 120 is greater than a quality of a signal received from LOT 130; a KPI indicator of LOT 120, e.g., a validity of a clock origin of LOT 120, is greater than the KPI indicator of LOT 130; an accuracy of a clock origin of LOT 120 is greater than an accuracy of a clock origin of LOT 130; and/or an availability of LOT 120 is better then an availability of LOT 130.

In some demonstrative embodiments, transmitter selector 142 may select the LOT based on information received from server 160. For example, server 160 may indicate to device 102 an accuracy of the clock origin of LOT 120, LOT 130, LOT 140 and/or LOT 150.

In some demonstrative embodiments, time controller 110 may determine the time of clock 122 based on a position of the selected LOT and one or more parameters relating to a transmission path between the LOT and device 102.

In some demonstrative embodiments, time calculator 141 may be configured to calculate the time of clock 122 based on the position of the selected LOT and the one or more parameters.

For example, transmitter selector 142 may select LOT 120 from LOTs 180, e.g., as described above, and time calculator 141 may calculate the time of clock 122 based on the position of LOT 120 and one or more parameters relating to a transmission path between LOT 120 and device 102.

In some demonstrative embodiments, the one or more parameters relating to an LOT may include a distance between device 102 and the LOT, a signal strength of an LOT signal received from the LOT via the transmission path, and/or a wave propagation parameter relating to a path between device 102 and the LOT.

In one example, time calculator 141 may calculate the time of clock 122 based on the position of LOT 120 and the distance between device 102 and LOT 120. For example, a position of device 102 may be known or determined, e.g., based on a previously determined position of device 102. Time calculator 141 may determine the distance between device 102 and LOT 120 based on the position of LOT 120 and the position of device 102. Time calculator 141 may receive a time of departure (TOD) of the LOT signal transmitted from LOT 120, e.g., from server 160 and/or as part of the time information of the LOT signal received from LOT 120. Time calculator 141 may calculate a time of flight (ToF) of the LOT signal from LOT 120 to device 102 based on the distance between device 102 and LOT 120, e.g., by dividing the distance by the speed of light. Time calculator 141 may determine the time of clock 122 based on the TOD and the TOF, e.g., as the sum of the TOD and the TOF.

In another example, time calculator 141 may calculate the time of clock 122 based on the position of LOT 120 and the signal strength of the LOT signal received from LOT 120 via the transmission path between LOT 120 and device 102. For example, time calculator 141 may receive the TOD of the LOT signal transmitted from LOT 120 and the signal strength of the LOT signal, e.g., from server 160 and/or as part of the LOT signal. Time calculator 141 may determine a signal strength attenuation of the LOT signal, e.g., a difference between the signal strength of the LOT signal, e.g., when transmitted by LOT 120, and the signal strength of the LOT signal, e.g., when received by device 102. Time calculator 141 may calculate the distance between device 102 and LOT 120 based on the signal strength attenuation. Time calculator 141 may calculate the time of clock 122 based on the position of LOT 120 and the distance between device 102 and LOT 120, e.g., as described above.

In another example, time calculator 141 may calculate the time of clock 122 based on the position of LOT 120 and the wave propagation parameter relating to the path between device 102 and the selected LOT. For example, time calculator 141 may receive the TOD of the LOT signal transmitted from LOT 120 and the wave propagation parameter relating to the path between device 102 and LOT 120, e.g., from server 160 and/or as part of the LOT signal. Time calculator 141 may determine the TOF between LOT 120 and device 102, e.g., based on the wave propagation parameter, and may determine the time of clock 122 based on the TOF and the TOD, e.g., as described above.

In some demonstrative embodiments, time controller 110 may switch between a first LOT, e.g., the selected LOT, and a second LOT, e.g., another LOT of LOTs 180, to be used for preserving the time of clock 122. For example, time controller 110 may switch from LOT 120 to LOT 130.

In some demonstrative embodiments, time controller 110 may switch between the first LOT and the second LOT, for example, if the LOT criterions with respect to the first and second LOTs indicate a reduced performance of the first LOT compared to a performance of the second LOT. For example, time controller 110 may switch from LOT 120 to LOT 130, for example, if a quality of a signal received from LOT 130 is greater than the quality of a signal received from LOT 120.

In some demonstrative embodiments, time KPIs assessment module 145 may evaluate the LOT criterions with respect to an LOT of LOTs 180 and may indicate to time controller 110 the performance and/or quality of the LOT.

In some demonstrative embodiments, time controller 110 may select the second LOT, and may switch from the first LOT to the second LOT, for example, upon receiving the indication of performance and/or quality of the first LOT.

In some demonstrative embodiments, time controller 110 may determine the time of clock 122 based on the second LOT, for example, after switching from the first LOT to the second LOT, e.g., as described above.

In some demonstrative embodiments, time controller 110 may determine the time of clock 122 based on more than one LOT, e.g., two or three LOTs.

In some demonstrative embodiments, time controller 110 may determine the time of clock 122 based on more than one LOT, for example, to improve an accuracy of the time of clock 122.

In some demonstrative embodiments, time controller 110 may control an accuracy level of clock 122.

In some demonstrative embodiments, policy controller 143 may receive requests from applications 115, wireless communication units 116 and/or any other component of device 102 for a required accuracy level of clock 122.

In some demonstrative embodiments, policy controller 143 may determine a mode of operation of time controller 110 based on the requests.

For example, time controller 110 may determine a first mode of operation in which the time of clock 122 may have a first accuracy level, or a second mode of operation in which the time of clock 122 may have a second accuracy level, e.g., lesser than the first accuracy level.

In some demonstrative embodiments, time controller 110 may select one or more of LOTs 180 and/or determine the number of the selected LOTs of LOTS 180 according to the mode of operation.

In one example, policy controller 143 may control time controller 110 to determine the time of clock 122 based on three LOTs, for example, if an application of applications 115 requests a relatively increased accuracy level, e.g., if the application includes a navigation application having a resolution of one meter.

In another example, policy controller 143 may control time controller 110 to determine the time of clock 122 based on one LOT, for example, if one LOT is sufficient for determining the time of clock 122 at a requested accuracy level, e.g., if the LOT has a relatively high signal quality.

In some demonstrative embodiments, time controller 110 may determine the time of clock 122 based on two LOTs 180, for example, if the time determined according to the LOT has reduced accuracy, e.g., if the LOT criterions of the LOT indicate that the LOT is not able to provide a relatively accurate time of clock 122, for example, if a signal quality of the LOT is relatively low.

In some demonstrative embodiments, time controller 110 may select two LOTs of LOTs 180, for example, based on the LOT criterions.

In some demonstrative embodiments, time controller 110 may determine the time of clock 122 based on a position of the two LOTs and one or more parameters relating to a transmission path between the two LOTs and device 102, e.g., as described above.

In some demonstrative embodiments, time controller 110 may determine the time of clock 122 based on three LOTs of LOTs 180, for example, to improve an accuracy of the time of clock 122. For example, time controller 110 may determine the time of clock 122 based on the three LOTs, for example, if the time determined based on the two LOTs has reduced accuracy.

In some demonstrative embodiments, time controller 110 may select three LOTs of LOTs 180, for example, based on the criterions described above.

In some demonstrative embodiments, time controller 110 may determine the time of clock 122 based on a position of the three LOTs and one or more parameters relating to a transmission path between the three LOTs and device 102, e.g., as described above.

In some demonstrative embodiments, time controller 110 may calibrate the time of clock 122, e.g., to improve the accuracy of the time of clock 122.

In some demonstrative embodiments, time calibration module 144 may calibrate the time of clock 122 upon an initiation of device 102, a predefined event and/or as a cyclic calibration procedure.

In one example, time calibration module 144 may calibrate the time of clock 122, for example, by increasing the number of LOTs, which are utilized to determine the time of clock 122.

In another example, time calibration module 144 may calibrate the time of clock 122, for example, by switching from one or more first LOTs of LOTs 180 to one or more second LOTs of LOTs 180, which have increased time characteristics, e.g., increased clock accuracy.

In some demonstrative embodiments, time controller 110 may preserve the time of clock 122 continuously. For example, time controller 110 may continuously determine the time of clock 122 based on the LOT signals received from LOT 120, e.g., by continuously tracking the LOT signals of LOT 120.

In some demonstrative embodiments, time controller 110 may perform partial preservation of the time of clock 122, for example based on a non-continuous tracking of the LOT signals of LOT 120, e.g., as described below.

In some demonstrative embodiments, time controller 110 may perform the partial preservation by determining the time of clock 122 based on the LOT signals, and updating the time of clock 122 based on the LOT signals, e.g., if a drift of the time is greater than a predefined drift threshold.

For example, time controller 110 may determine the time of clock 122 based on the LOT signals, e.g., as described above. Time controller may monitor a drift of the time of clock 122. Time controller 110 may perform the partial preservation, for example, by calibrating the time of clock 122 when a drifting of clock 122 is greater than a predefined drifting threshold. For example, time controller 110 may monitor a drifting of clock 122, and may calibrate the time of clock 122 based on the LOT signals of LOT 120, for example, when the drifting of clock 122 exceeds the predefined drifting threshold. In other embodiments, time controller 110 may preserve the time of clock 122 periodically.

In some demonstrative embodiments, partial-preservation of the time of clock 122 partially may reduce power consumption of device 102, e.g., compared to a power consumption when continuously preserving the time of clock 122. For example, time controller 110 may track the LOT signals of LOT 120, e.g., only when detecting a drift in the time of clock 122, which exceeds the drifting threshold.

In some demonstrative embodiments, preserving the time of clock 122 may enable improved performance of device 102 and/or reduced power consumption of device 102. For example, preserving the time of clock 122 may enable a relatively reduced period of time to acquire a GNSS satellite, which may improve the performance and/or may reduce the power consumption of device 102.

Figure 2:
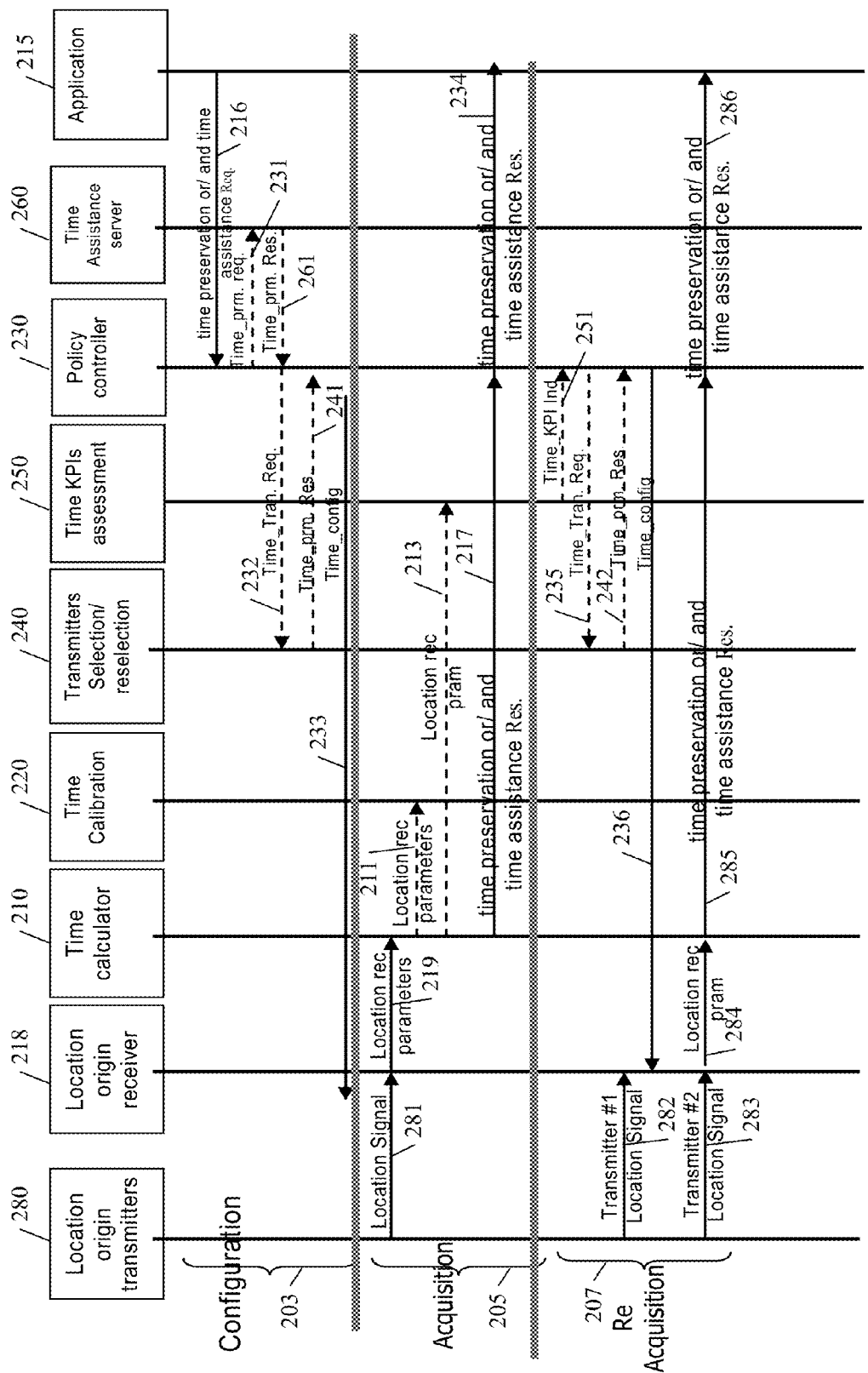
FIG. 2 is a schematic sequence diagram of operations and interactions to preserve time of a clock of a mobile device, in accordance with some demonstrative embodiments.

Reference is made to FIG. 2, which schematically illustrates a sequence diagram, which demonstrates operations and interactions to preserve time of a clock of a mobile device, in accordance with some demonstrative embodiments. For example, the mobile device may perform the functionality of mobile device 102 (FIG. 1).

As shown in FIG. 2, during a configuration stage 203 the mobile device may select an LOT from a plurality of LOTs 280.

In some demonstrative embodiments, LOTs 280 may perform the functionality of LOTs 180 (FIG. 1).

As shown in FIG. 2, an application 215 may send to a policy controller 230 a request 216 for time preservation and/or time assistance from an LOT. For example, application 215 may perform the functionality of application 115 (FIG. 1), and/or policy controller 230 may perform the functionality of policy controller 143 (FIG. 1).

In one example, application 115 (FIG. 1) may send request 216 to policy controller 143 (FIG. 1), e.g., as described above.

As shown in FIG. 2, policy controller 230 may send to a time assistance server 260 a request 231 for time parameters of one or more of LOTs 280. For example, server 260 may perform the functionality of server 160 (FIG. 1).

In one example, time controller 110 (FIG. 1) may send request 231 to server 160 (FIG. 1), e.g., as described above.

As shown in FIG. 2, server 260 may send to policy controller 230 a response 261 including the time parameters of the one or more LOTs 280, for example, in response to request 231, e.g., as described above.

As shown in FIG. 2, policy controller 230 may send a request 232 to a transmitters selections/reselection module 240 to select an LOT of LOTs 280. For example, module 240 may perform the functionality of transmitter selector 142 (FIG. 1).

As shown in FIG. 2, module 240 may send a response 241 to policy controller 230 including time parameters of the selected LOT, e.g., in response to request 232.

As shown in FIG. 2, policy controller 230 may send to a location origin receiver 218 a request 233 for time configuration of the selected LOT. For example, location origin receiver 218 may perform the functionality of location origin receiver 118 (FIG. 1).

As shown in FIG. 2, during an acquisition stage 205 the mobile device may acquire the selected LOT of LOTs 280, as described below.

As shown in FIG. 2, the selected LOT 280 may transmit LOT signal 281 including location parameters of a location of the selected LOT.

As shown in FIG. 2, location origin receiver 218 may receive LOT signal 281 from the selected LOT.

As shown in FIG. 2, location origin receiver 218 may send a message 219 to a time calculator 210 including the location parameters of the selected LOT. For example, time calculator 210 may perform the functionality of time calculator 141 (FIG. 1).

In some demonstrative embodiments, time calculator 210 may calculate the time of clock 122 (FIG. 1) based on the location parameters of the selected LOT, e.g., as described above.

As shown in FIG. 2, time calculator 210 may send a message 211 to a time calibration module 220 including the calculated time. For example, time calibration module 220 may perform the functionality of time calibration module 144 (FIG. 1).

As shown in FIG. 2, time calculator 210 may send a message 213 to a time KPI assessment module 250 including the calculated time. For example, time KPI assessment module 250 may perform the functionality of time KPI assessment 145 (FIG. 1).

As shown in FIG. 2, time calculator 210 may send to policy controller 230 a time preservation and/or time assistance response 217 including the calculated time, e.g., in response to request 233.

As shown in FIG. 2, policy controller 230 may send to application 215 a time preservation and/or time assistance response 217 including the calculated time.

For example, time controller 110 (FIG. 2) may send response 217 to applications 115 (FIG. 1) including a relatively accurate time to enable one or more functionalities of applications 115 (FIG. 1)

As shown in FIG. 2, during a reacquisition stage 207 the mobile device may reacquire another LOT of LOTs 280, as described in detail below.

As shown in FIG. 2, time KPI assessment module 250 may send an indication 251 to policy controller 230 including an indication of a change of a KPI with respect to the selected LOT.

As shown in FIG. 2, policy controller 230 may send a request 235 to module 240 to select another LOT of LOTs 280, e.g., in response to indication 251.

As shown in FIG. 2, module 240 may send a response 242 to policy controller 230 including time parameters of other LOTs.

As shown in FIG. 2, location origin receiver 218 may receive a first signal 282 from a first other LOT of LOTs 280.

As shown in FIG. 2, policy controller 230 may send to location origin receiver 218 a request 236 for time configuration of the first other LOT.

As shown in FIG. 2, location origin receiver 218 may receive a second signal 283 from a second other LOT of LOTs 280.

As shown in FIG. 2, location origin receiver 218 may send a message 284 to time calculator 210 including the location parameters of the first and second other LOTs.

In some demonstrative embodiments, time calculator 210 may calculate the time of clock 122 (FIG. 1) based on the location parameters of the first and second other LOTs, e.g., as described above.

As shown in FIG. 2, time calculator 210 may send to policy controller 230 a time preservation and/or time assistance response 285 including the calculated time based on the first and second other LOTs, e.g., in response to rime configuration request 236.

As shown in FIG. 2, policy controller 230 may send to application 215 a time preservation and/or time assistance response 286 including the calculated time.

In some demonstrative embodiments, application 215 may utilize the calculated time for one or more functionalists of application 215.

Figure 3:
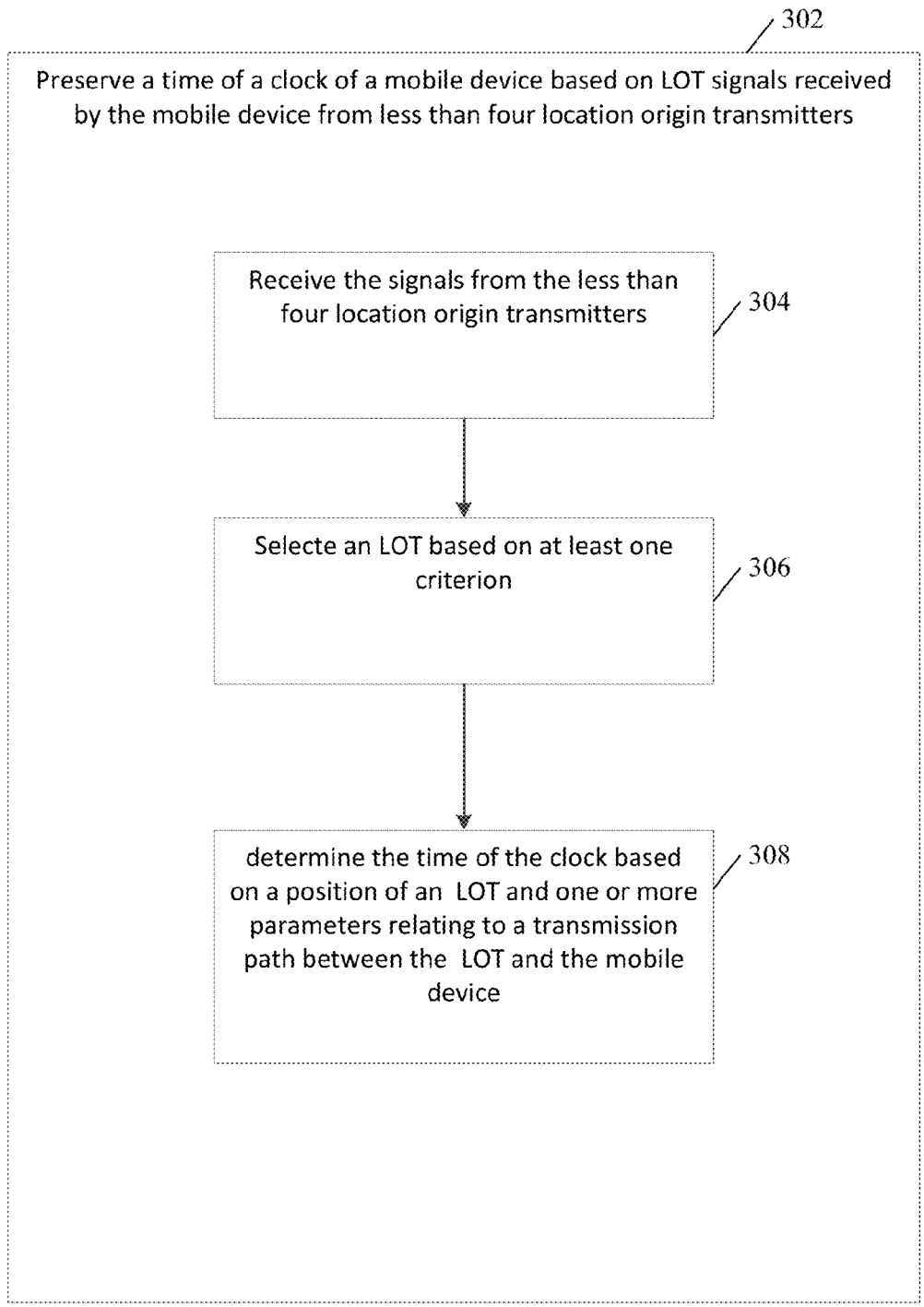
FIG. 3 is a schematic flow chart illustration of a method of time preservation, in accordance with some demonstrative embodiments.

Reference is now made to FIG. 3, which schematically illustrates a method of time preservation, in accordance with some demonstrative embodiments. For example, one or more of the operations of the method of FIG. 3 may be performed by a wireless communication system, e.g., system 100 (FIG. 1); a mobile device, e.g., device 102 (FIG. 1); a server, e.g., server 160 (FIG. 1), a wireless communication module, e.g., wireless communication module 105 (FIG. 1) and/or a time calculator, e.g., time controller 110 (FIG. 1).

As indicated at block 302, the method may include preserving a time of a clock of a mobile device based on LOT signals received by the mobile device from less than four location origin transmitters. For example, controller 110 (FIG. 1) may preserve the time of clock 122 (FIG. 1) based on signals received by device 102 from less than four LOTs 180 (FIG. 1), e.g., as described above.

As indicated at block 308, preserving the time of the clock may include determining the time of the clock based on a position of an LOT and one or more parameters relating to a transmission path between the LOT and the mobile device. For example, controller 110 (FIG. 1) may determine the time of clock 122 (FIG. 1) based on the position of LOT 120 (FIG. 1), and one or more parameters relating to a transmission path between LOT 120 and device 102 (FIG. 1), e.g., as described above.

As indicated at block 304, preserving the time of the clock may include receiving the LOT signals from the less than four location origin transmitters. For example, location origin receiver 118 (FIG. 1) may receive signals from less than four LOTs 180 (FIG. 1), e.g., as described above.

As indicated at block 306, preserving the time of the clock may include selecting an LOT of the less than four LOTs based on at least one criterion. For example, controller 110 (FIG. 1) may select LOT 120 (FIG. 1) from LOTs 180 (FIG. 1) based on the LOT criterions, e.g., as described above.

Figure 4:
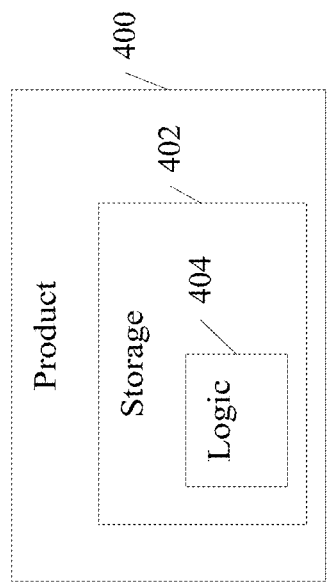
FIG. 4 is a schematic illustration of a product of manufacture, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of device 102 (FIG. 1), wireless communication module 105 (FIG. 1), server 160 (FIG. 1), time controller 110 (FIG. 1), and/or to perform one or more operations of the method of FIG. 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a time controller to preserve a time of a clock of a mobile device based on signals received by the mobile device from less than four location origin transmitters, the time controller is to determine the time based on a position of a location origin transmitter of the less than four location origin transmitters and one or more parameters relating to a transmission path between the location origin transmitter and the mobile device.

Example 2 includes the subject matter of Example 1 and optionally, wherein the time controller is to preserve the time of the clock based on signals received by the mobile device from less than three location origin transmitters.

Example 3 includes the subject matter of Example 1 and optionally, wherein the time controller is to preserve the time of the clock based on signals received by the mobile device from a single location origin transmitter.

Example 4 includes the subject matter of any one of Examples 1-3 and optionally, wherein a signal received from the location origin transmitter indicates the position of the location origin transmitter.

Example 5 includes the subject matter of any one of Examples 1-4 and optionally, wherein the time controller is to receive the position from a server.

Example 6 includes the subject matter of any one of Examples 1-5 and optionally, wherein the time controller is to select the location origin transmitter based on at least one criterion selected from the group consisting of a quality criterion relating to a quality of a signal received from the location origin transmitter, a key performance indicator (KPI) criterion, an accuracy criterion relating to an accuracy of a clock of the location origin transmitter, and an availability criterion relating to an availability of the location origin transmitter.

Example 7 includes the subject matter of any one of Examples 1-6 and optionally, wherein the time controller is to receive the one or more parameters from a server.

Example 8 includes the subject matter of any one of Examples 1-7 and optionally, wherein the position includes a position selected from the group consisting of an orbit position and a position FIX.

Example 9 includes the subject matter of any one of Examples 1-8 and optionally, wherein the one or more parameters include a parameter selected from the group consisting of a distance between the mobile device and the location origin transmitter, a signal strength of a signal received via the transmission path, and a wave propagation parameter relating to a path between the mobile device and the location original transmitter.

Example 10 includes the subject matter of any one of Examples 1-9 and optionally, wherein the location origin transmitter includes a transmitter selected from the group consisting of a global navigation satellite system (GNSS) transmitter, a wireless-fidelity (WiFi) transmitter and a cellular transmitter.

Example 11 includes the subject matter of any one of Examples 1-10 and optionally, wherein the time controller is to perform partial preservation of the time of the clock by determining the time of the clock based on the signals, and updating the time of the clock based on the signals if a drift of the time is greater than a predefined drift threshold.

Example 12 includes a system comprising a mobile device comprising at least one antenna; and a time controller to preserve a time of a clock of the mobile device based on signals received by the mobile device from less than four location origin transmitters, the time controller is to determine the time based on a position of a location origin transmitter of the less than four location origin transmitters and one or more parameters relating to a transmission path between the location origin transmitter and the mobile device.

Example 13 includes the subject matter of Example 12 and optionally, wherein the time controller is to preserve the time of the clock based on signals received by the mobile device from less than three location origin transmitters.

Example 14 includes the subject matter of Example 12 and optionally, wherein the time controller is to preserve the time of the clock based on signals received by the mobile device from a single location origin transmitter.

Example 15 includes the subject matter of any one of Examples 12-14 and optionally, wherein a signal received from the location origin transmitter indicates the position of the location origin transmitter.

Example 16 includes the subject matter of any one of Examples 12-15 and optionally, wherein the time controller is to receive the position from a server.

Example 17 includes the subject matter of any one of Examples 12-16 and optionally, wherein the time controller is to select the location origin transmitter based on at least one criterion selected from the group consisting of a quality criterion relating to a quality of a signal received from the location origin transmitter, a key performance indicator (KPI) criterion, an accuracy criterion relating to an accuracy of a clock of the location origin transmitter, and an availability criterion relating to an availability of the location origin transmitter.

Example 18 includes the subject matter of any one of Examples 12-17 and optionally, wherein the time controller is to receive the one or more parameters from a server.

Example 19 includes the subject matter of any one of Examples 12-18 and optionally, wherein the position includes a position selected from the group consisting of an orbit position and a position FIX.

Example 20 includes the subject matter of any one of Examples 12-19 and optionally, wherein the one or more parameters include a parameter selected from the group consisting of a distance between the mobile device and the location origin transmitter, a signal strength of a signal received via the transmission path, and a wave propagation parameter relating to a path between the mobile device and the location original transmitter.

Example 21 includes the subject matter of any one of Examples 12-20 and optionally, wherein the location origin transmitter includes a transmitter selected from the group consisting of a global navigation satellite system (GNSS) transmitter, a wireless-fidelity (WiFi) transmitter and a cellular transmitter.

Example 22 includes the subject matter of any one of Examples 12-21 and optionally, wherein the time controller is to perform partial preservation of the time of the clock by determining the time of the clock based on the signals, and updating the time of the clock based on the signals if a drift of the time is greater than a predefined drift threshold.

Example 23 includes a method comprising receiving signals from less than four location origin transmitters; and determining a time of a clock of a mobile device based on the signals, a position of a location origin transmitter of the less than four location origin transmitters and one or more parameters relating to a transmission path between the location origin transmitter and the mobile device.

Example 24 includes the subject matter of Example 23 and optionally, comprising determining the time of the clock based on signals received from less than three location origin transmitters.

Example 25 includes the subject matter of Example 23 and optionally, comprising determining the time of the clock based on signals received from a single location origin transmitter.

Example 26 includes the subject matter of any one of Examples 23-25 and optionally, wherein a signal received from the location origin transmitter indicates the position of the location origin transmitter.

Example 27 includes the subject matter of any one of Examples 23-26 and optionally comprising receiving the position from a server.

Example 28 includes the subject matter of any one of Examples 23-27 and optionally comprising selecting the location origin transmitter based on at least one criterion selected from the group consisting of a quality criterion relating to a quality of a signal received from the location origin transmitter, a key performance indicator (KPI) criterion, an accuracy criterion relating to an accuracy of a clock of the location origin transmitter, and an availability criterion relating to an availability of the location origin transmitter.

Example 29 includes the subject matter of any one of Examples 23-28 and optionally comprising receiving the one or more parameters from a server.

Example 30 includes the subject matter of any one of Examples 23-29 and optionally, wherein the position includes a position selected from the group consisting of an orbit position and a position FIX.

Example 31 includes the subject matter of any one of Examples 23-30 and optionally, wherein the one or more parameters include a parameter selected from the group consisting of a distance between the mobile device and the location origin transmitter, a signal strength of a signal received via the transmission path, and a wave propagation parameter relating to a path between the mobile device and the location original transmitter.

Example 32 includes the subject matter of any one of Examples 23-31 and optionally, wherein the location origin transmitter includes a transmitter selected from the group consisting of a global navigation satellite system (GNSS) transmitter, a wireless-fidelity (WiFi) transmitter and a cellular transmitter.

Example 33 includes the subject matter of any one of Examples 23-32 and optionally comprising performing partial preservation of the time of the clock by determining the time of the clock based on the signals, and updating the time of the clock based on the signals if a drift of the time is greater than a predefined drift threshold.

Example 34 includes a product including a non-transitory storage medium having stored thereon instructions that, when executed by a machine, result in preserving a time of a clock of a mobile device based on signals received by the mobile device from less than four location origin transmitters, the preserving including determining the time based on a position of a location origin transmitter of the less than four location origin transmitters and one or more parameters relating to a transmission path between the location origin transmitter and the mobile device.

Example 35 includes the subject matter of Example 34 and optionally, wherein the instructions result in determining the time of the clock based on signals received from less than three location origin transmitters.

Example 36 includes the subject matter of Example 34 and optionally, wherein the instructions result in determining the time of the clock based on signals received from a single location origin transmitter.

Example 37 includes the subject matter of any one of Examples 34-36 and optionally, wherein a signal received from the location origin transmitter indicates the position of the location origin transmitter.

Example 38 includes the subject matter of any one of Examples 34-37 and optionally, wherein the instructions result in receiving the position from a server.

Example 39 includes the subject matter of any one of Examples 34-38 and optionally, wherein the instructions result in selecting the location origin transmitter based on at least one criterion selected from the group consisting of a quality criterion relating to a quality of a signal received from the location origin transmitter, a key performance indicator (KPI) criterion, an accuracy criterion relating to an accuracy of a clock of the location origin transmitter, and an availability criterion relating to an availability of the location origin transmitter.

Example 40 includes the subject matter of any one of Examples 34-39 and optionally, wherein the instructions result in receiving the one or more parameters from a server.

Example 41 includes the subject matter of any one of Examples 34-40 and optionally, wherein the position includes a position selected from the group consisting of an orbit position and a position FIX.

Example 42 includes the subject matter of any one of Examples 34-41 and optionally, wherein the one or more parameters include a parameter selected from the group consisting of a distance between the mobile device and the location origin transmitter, a signal strength of a signal received via the transmission path, and a wave propagation parameter relating to a path between the mobile device and the location original transmitter.

Example 43 includes the subject matter of any one of Examples 34-42 and optionally, wherein the location origin transmitter includes a transmitter selected from the group consisting of a global navigation satellite system (GNSS) transmitter, a wireless-fidelity (WiFi) transmitter and a cellular transmitter.

Example 44 includes the subject matter of any one of Examples 34-43 and optionally, wherein the instructions result in performing partial preservation of the time of the clock by determining the time of the clock based on the signals, and updating the time of the clock based on the signals if a drift of the time is greater than a predefined drift threshold.

Example 45 includes an apparatus comprising means for preserving a time of a clock of a mobile device based on signals received by the mobile device from less than four location origin transmitters, the means for preserving includes means for determining the time based on a position of a location origin transmitter of the less than four location origin transmitters and one or more parameters relating to a transmission path between the location origin transmitter and the mobile device.

Example 46 includes the subject matter of Example 45 and optionally, comprising means for determining the time of the clock based on signals received from less than three location origin transmitters.

Example 47 includes the subject matter of Example 45 and optionally, comprising means for determining the time of the clock based on signals received from a single location origin transmitter.

Example 48 includes the subject matter of any one of Examples 45-47 and optionally, wherein a signal received from the location origin transmitter indicates the position of the location origin transmitter.

Example 49 includes the subject matter of any one of Examples 45-48 and optionally comprising means for receiving the position from a server.

Example 50 includes the subject matter of any one of Examples 45-49 and optionally comprising means for selecting the location origin transmitter based on at least one criterion selected from the group consisting of a quality criterion relating to a quality of a signal received from the location origin transmitter, a key performance indicator (KPI) criterion, an accuracy criterion relating to an accuracy of a clock of the location origin transmitter, and an availability criterion relating to an availability of the location origin transmitter.

Example 51 includes the subject matter of any one of Examples 45-50 and optionally comprising means for receiving the one or more parameters from a server.

Example 52 includes the subject matter of any one of Examples 45-51 and optionally, wherein the position includes a position selected from the group consisting of an orbit position and a position FIX.

Example 53 includes the subject matter of any one of Examples 45-52 and optionally, wherein the one or more parameters include a parameter selected from the group consisting of a distance between the mobile device and the location origin transmitter, a signal strength of a signal received via the transmission path, and a wave propagation parameter relating to a path between the mobile device and the location original transmitter.

Example 54 includes the subject matter of any one of Examples 45-53 and optionally, wherein the location origin transmitter includes a transmitter selected from the group consisting of a global navigation satellite system (GNSS) transmitter, a wireless-fidelity (WiFi) transmitter and a cellular transmitter.

Example 55 includes the subject matter of any one of Examples 45-54 and optionally comprising means for performing partial preservation of the time of the clock by determining the time of the clock based on the signals, and updating the time of the clock based on the signals if a drift of the time is greater than a predefined drift threshold.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a time controller to process at a mobile device a request message from a component of the mobile device, the request message comprising an indication of a requested clock accuracy, the time controller configured to determine a count of less than four location origin transmitters based at least on the requested clock accuracy, the time controller configured to generate a response message to the component of the mobile device comprising a calculated time of a clock of the mobile device based on signals received by the mobile device from the less than four location origin transmitters, said time controller is configured to determine said calculated time based on position and transmission path information corresponding to the less than four location origin transmitters, the position and transmission path information comprising, for a location origin transmitter of said less than four location origin transmitters, a position of the location origin transmitter of said less than four location origin transmitters and one or more parameters relating to a transmission path between said location origin transmitter and said mobile device.

2. The apparatus of claim 1, wherein said time controller is configured to determine the calculated time of said clock based on signals received by the mobile device from less than three location origin transmitters.

3. The apparatus of claim 1, wherein said time controller is configured to determine the calculated time of said clock based on signals received by the mobile device from a single location origin transmitter.

4. The apparatus of claim 1, wherein a signal received from said location origin transmitter indicates the position of said location origin transmitter.

5. The apparatus of claim 1, wherein said time controller is configured to receive said position of the location origin transmitter from a server.

6. The apparatus of claim 1, wherein said time controller is configured to select said location origin transmitter based on at least one criterion selected from the group consisting of a quality criterion relating to a quality of a signal received from said location origin transmitter, a key performance indicator (KPI) criterion, an accuracy criterion relating to an accuracy of a clock of said location origin transmitter, and an availability criterion relating to an availability of said location origin transmitter.

7. The apparatus of claim 1, wherein said time controller is configured to receive said one or more parameters from a server.

8. The apparatus of claim 1, wherein said position of the location origin transmitter includes a position selected from the group consisting of an orbit position and a position FIX.

9. The apparatus of claim 1, wherein said one or more parameters include a parameter selected from the group consisting of a distance between said mobile device and said location origin transmitter, a signal strength of a signal received via the transmission path, and a wave propagation parameter relating to a propagation of a wave in a path between said mobile device and said location origin transmitter.

10. The apparatus of claim 1, wherein said location origin transmitter includes a transmitter selected from the group consisting of a global navigation satellite system (GNSS) transmitter, a wireless-fidelity (WiFi) transmitter and a cellular transmitter.

11. The apparatus of claim 1, wherein said time controller is configured to calibrate said clock based on said signals if a drift of said clock is greater than a predefined drift threshold.

12. A system comprising:
a mobile device comprising:
at least one antenna; and
a time controller configured to process a request message from a component of the mobile device, the request message comprising an indication of a requested clock accuracy, the time controller configured to determine a count of less than four location origin transmitters based at least on the requested clock accuracy, the time controller is configured to generate a response message to the component of the mobile device comprising a calculated time of a clock of the mobile device based on signals received by the mobile device from the less than four location origin transmitters, said time controller is configured to determine said calculated time based on position and transmission path information corresponding to the less than four location origin transmitters, the position and transmission path information comprising, for a location origin transmitter of said less than four location origin transmitters, a position of the location origin transmitter of said less than four location origin transmitters and one or more parameters relating to a transmission path between said location origin transmitter and said mobile device.

13. The system of claim 12, wherein a signal received from said location origin transmitter indicates the position of said location origin transmitter.

14. The system of claim 12, wherein said time controller is configured to receive said position of the location origin transmitter from a server.

15. The system of claim 12, wherein said time controller is configured to select said location origin transmitter based on at least one criterion selected from the group consisting of a quality criterion relating to a quality of a signal received from said location origin transmitter, a key performance indicator (KPI) criterion, an accuracy criterion relating to an accuracy of a clock of said location origin transmitter, and an availability criterion relating to an availability of said location origin transmitter.

16. The system of claim 12, wherein said time controller is configured to receive said one or more parameters from a server.

17. The system of claim 12, wherein said position of the location origin transmitter includes a position selected from the group consisting of an orbit position and a position FIX.

18. The system of claim 12, wherein said one or more parameters include a parameter selected from the group consisting of a distance between said mobile device and said location origin transmitter, a signal strength of a signal received via the transmission path, and a wave propagation parameter relating to a propagation of a wave in a path between said mobile device and said location origin transmitter.

19. The system of claim 12, wherein said time controller is configured to calibrate said clock based on said signals if a drift of said clock is greater than a predefined drift threshold.

20. A method comprising:
  processing, by a time controller of a mobile device, a request message from a component of the mobile device, the request message comprising an indication of a requested clock accuracy;
  determining, by the time controller, a count of less than four location origin transmitters based at least on the requested clock accuracy;
  receiving signals from the less than four location origin transmitters; and
  generating, by the time controller, a response message to the component of the mobile device, the response message comprising a calculated time of a clock of the mobile device based on said signals and position and transmission path information corresponding to the less than four location origin transmitters, the position and transmission path information comprising, for a location origin transmitter of said less than four location origin transmitters, a position of the location origin transmitter of said less than four location origin transmitters and one or more parameters relating to a transmission path between said location origin transmitter and said mobile device.

21. The method of claim 20, wherein a signal received from said location origin transmitter indicates the position of said location origin transmitter.

22. The method of claim 20 comprising receiving said position of the location origin transmitter from a server.

23. The method of claim 20 comprising selecting said location origin transmitter based on at least one criterion selected from the group consisting of a quality criterion relating to a quality of a signal received from said location origin transmitter, a key performance indicator (KPI) criterion, an accuracy criterion relating to an accuracy of a clock of said location origin transmitter, and an availability criterion relating to an availability of said location origin transmitter.

24. The method of claim 20 comprising receiving said one or more parameters from a server.

25. The method of claim 20 comprising calibrating said clock based on said signals if a drift of said clock is greater than a predefined drift threshold.

26. A product including a non-transitory storage medium having stored thereon instructions that, when executed by a machine, result in:
  processing, by a time controller of a mobile device, a request message from a component of the mobile device, the request message comprising an indication of a requested clock accuracy;
  determining, by the time controller, a count of less than four location origin transmitters based at least on the requested clock accuracy;
  determining, by the time controller, a calculated time of a clock of the mobile device based on signals received by the mobile device from the less than four location origin transmitters, said determining the calculated time comprising determining said calculated time based on position and transmission path information corresponding to the less than four location origin transmitters, the position and transmission path information comprising, for a location origin transmitter of said less than four location origin transmitters, a position of the location origin transmitter of said less than four location origin transmitters and one or more parameters relating to a transmission path between said location origin transmitter and said mobile device; and
  providing a response message from the time controller to the component of the mobile device comprising the calculated time.

27. The product of claim 26, wherein a signal received from said location origin transmitter indicates the position of said location origin transmitter.

28. The product of claim 26, wherein said instructions result in receiving said position of the location origin transmitter from a server.

29. The product of claim 26, wherein said instructions result in selecting said location origin transmitter based on at least one criterion selected from the group consisting of a quality criterion relating to a quality of a signal received from said location origin transmitter, a key performance indicator (KPI) criterion, an accuracy criterion relating to an accuracy of a clock of said location origin transmitter, and an availability criterion relating to an availability of said location origin transmitter.

30. The product of claim 26, wherein said instructions result in calibrating said clock based on said signals if a drift of said clock is greater than a predefined drift threshold.

* * * * *